(12) United States Patent
Liao

(10) Patent No.: US 8,610,888 B1
(45) Date of Patent: Dec. 17, 2013

(54) LIGHT MEASUREMENT SYSTEM

(75) Inventor: Chun-Chieh Liao, New Taipei (TW)

(73) Assignee: Askey Computer Corp. (TW)

( * ) Notice: Subject to any disclaimer, the term of this patent is extended or adjusted under 35 U.S.C. 154(b) by 0 days.

(21) Appl. No.: 13/584,882

(22) Filed: Aug. 14, 2012

(30) Foreign Application Priority Data

Jun. 7, 2012 (TW) .............................. 101120470 A

(51) Int. Cl.
*G01J 1/00* (2006.01)
(52) U.S. Cl.
USPC ........................................................ 356/213
(58) Field of Classification Search
USPC ........................................................ 356/213
See application file for complete search history.

(56) References Cited

U.S. PATENT DOCUMENTS

| 7,301,164 B2 * | 11/2007 | Daugherty et al. ...... 250/559.01 |
| 7,450,239 B2 * | 11/2008 | Uehara et al. ................. 356/451 |
| 2010/0265509 A1 * | 10/2010 | Jones et al. .................... 356/445 |

* cited by examiner

*Primary Examiner* — Tu Nguyen
(74) *Attorney, Agent, or Firm* — Schmeiser, Olsen & Watts, LLP

(57) ABSTRACT

A light measurement system measures light characteristics of a plurality of light sources and includes a processing unit, a plurality of capturing modules, a plurality of signal conversion units, and a demultiplexing unit. The processing unit generates a control signal for controlling the capturing modules to capture the light characteristics of the light sources. After capturing the light characteristics, the capturing modules output captured frequency-related data corresponding to the light characteristics respectively. Then, the capture frequency-related data are converted into capture bit codes by the signal conversion units respectively. Under the control of the processing unit, the demultiplexing unit selectively sends the capture bit code of each of the signal conversion units to the processing unit. Accordingly, the light measurement system measures the light sources synchronously and allows the demultiplexing unit to send the capture bit code of any one of the light sources to the processing unit.

10 Claims, 3 Drawing Sheets

LIGHT MEASUREMENT SYSTEM

CROSS-REFERENCE TO RELATED APPLICATION

This non-provisional application claims priority under 35 U.S.C. §119(a) on Patent Application No(s). 101120470 filed in Taiwan, R.O.C. on Jun. 7, 2012, the entire contents of which are hereby incorporated by reference.

FIELD OF TECHNOLOGY

The present invention relates to a measurement system, in particular to the light measurement system that measures light characteristics of a plurality of light sources by a parallel processing structure.

BACKGROUND

With reference to FIG. 1 for a conventional light measurement system 2, the light measurement system 2 is provided for measuring for measuring the light characteristics (such as wavelength, phase, polarization state, chrominance and lumen intensity) of a plurality of light sources 22, 24, 26, 28, and the light measurement system 2 comprises a plurality of capturers 212, 214, 216, 218, a demultiplexer 220, a signal processor 222 and a processing unit 224. Wherein, the quantity of capturers 212, 214, 216, 218 is equal to the quantity of light sources 22, 24, 26, 28. In other words, one capturer is corresponsive to one light source.

In addition, the demultiplexer 220 is a component having a plurality of first terminals 2202 corresponding to a single second terminal 2204, and the demultiplexer 220 receives an external control signal CS to control one of the first terminals 2202 to connect the second terminal 2204 in order to select a connection path CP between the first terminals 2202 and the second terminal 2204. The first terminal 2202 has 4 pins and the second terminal 2204 has 1 pin, and the demultiplexer 220 is a 1-to-4 demultiplexer depending on the number of pins.

In light measurement system 2, the processing unit 224 issues and transmits a digital detecting signal DS to the signal processor 222, and the signal processor 222 converts the detecting signal DS into an analog detecting signal DS' and outputs the analog detecting signal DS' to the second terminal 2204 of the demultiplexer 220, and the demultiplexer 220 switches the connection path CP of the control signal CS sequentially, so that the detecting signal DS' can be transmitted from the first terminals 2202 to each of the capturers 212, 214, 216, 218 to drive each of the capturers 212, 214, 216, 218 to detect the light sources 22, 24, 26, 28, so as to determine whether or not the light sources 22, 24, 26, 28 produce lights. For example, if the capturer 212 detects that there is a light produced by the light source 22, the capturer 212 captures the light characteristics of the light source 22 and outputs an analog capture signal CAPS, and the capture signal CAPS is transmitted to the first terminals 2202 of the demultiplexer 220, and the control signal CS is provided for the sequential switch, so that the capture signals CAPS captured by the capturer 212 can be outputted from the second terminal 2204. Since only the capturer 212 captures the capture signal CAPS, therefore it is necessary to wait for the control signal CS to select the first terminal 2202 and the capturer 212 before the analog capture signal CAPS captured by the capturer 212 can be transmitted to the signal processor 22 through the demultiplexer 220, and the analog capture signal CAPS is converted by the signal processor 222 and provided for generating the digital capture signal CAPS' and allowing the processing unit 224 to analyze the light characteristics of the light source 22.

Although the aforementioned measurement system can measure the light characteristics of different light sources 22, 24, 26, 28, the processing unit 224 has to wait for the switching time of the demultiplexer 220 and the time for converting data types by the signal processor 222 to allow the processing unit 224 to obtain the light characteristics captured by the light sources 22, 24, 26, 28. According to the total time spent, the conventional measuring method is very inefficient.

Therefore, finding a way to quickly measure related light characteristics of a plurality of light sources demands immediate attentions and feasible solutions.

SUMMARY

It is a primary objective of the present invention to provide a light measurement system with a parallel processing structure for measuring light characteristics (such as wavelength, phase, polarization state, chrominance and lumen intensity) of a plurality of light sources quickly.

Another objective of the present invention is to provide a light measurement system that uses a field programmable gate array (FPGA) to measure a plurality of light sources freely, simultaneously and quickly.

To achieve the aforementioned and other objectives, the present invention provides a light measurement system for measuring light characteristics of a plurality of light sources, and the light measurement system comprises a processing unit, a plurality of capturing modules, a plurality of signal conversion units and a demultiplexing unit. Wherein, the processing unit includes a plurality of pins, and the processing unit sends out a control signal through the pins; the capturing modules are coupled to the processing unit, and each of the capturing modules is provided for capturing the light characteristics of each of the light sources, and each of the capturing modules includes a control unit and a sampling unit, and the control unit controls the sampling unit to capture the light characteristics of the corresponding light source according to the control signal. In addition, the sampling unit outputs captured frequency-related data according to the light characteristics; each of the signal conversion units is coupled to the sampling unit of each of the capturing modules for converting the captured data into a capture bit code; and the demultiplexing unit is coupled to the signal conversion units and the processing unit, and the demultiplexing unit switches a connection path between each of the signal conversion units and the processing unit according to the control signal of the processing unit for outputting the capture bit code to the processing unit from each of the signal conversion units.

Compared with the prior art, the present invention provides a light measurement system with a parallel processing structure for measuring the light characteristics of a plurality of light sources, and the system simultaneously obtains related light characteristics of the light sources in advance from the plurality of connected capturing modules and converts a plurality of captured frequency-related data, and then the plurality of signal conversion units converts the captured data into a capture bit code, and the capture bit code is kept in the signal conversion units, and the demultiplexing unit outputs the capture bit code of the signal conversion unit to the processing unit based on the switch of the control signal to analyze the light characteristics.

Therefore, the present invention can shorten the measurement time and measures the light sources more effectively and efficiently than the prior art.

DETAILED DESCRIPTION

The objects, characteristics and effects of the present invention will become apparent with the detailed description of the preferred embodiments and the illustration of related drawings as follows.

Figure 1:
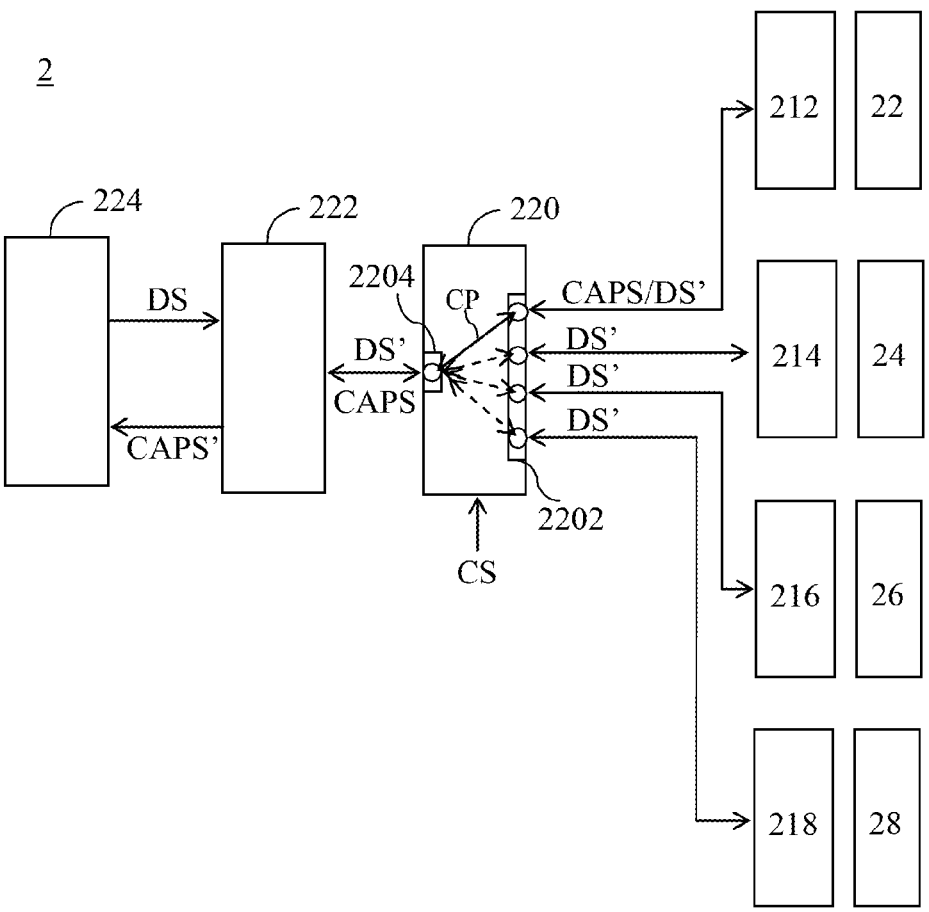
FIG. 1 is a schematic block diagram of a conventional light measurement system.
Figure 2:
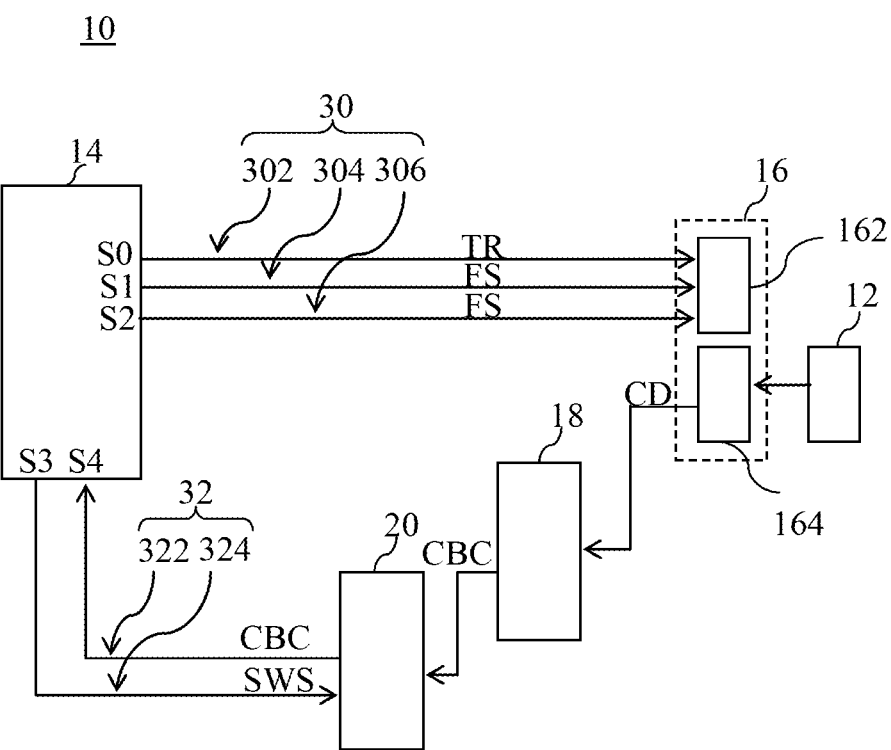
FIG. 2 is a schematic block diagram of a light measurement system in accordance with a first preferred embodiment of the present invention.

With reference to FIG. 2 for a schematic block diagram of a light measurement system in accordance with the first preferred embodiment of the present invention, the light measurement system 10 is provided for measuring a plurality of light characteristics of a light source 12. For example, the light characteristics include a wavelength, a phase, a polarization state, a chrominance and a lumen intensity of the light source, wherein the light characteristics of this embodiment include the chrominance and the lumen intensity of the light source 12 having a wavelength within a range (such as the wavelength proximate to the frequency bands of red light, green light and blue light).

In addition, the wavelength of the light source 12 is a wavelength of red light that falls within a range from 622 nm to 780 nm, a wavelength of green light that falls within a range from 492 nm to 577 nm, or a wavelength of blue light that falls within a range from 455 nm to 492 nm. Further, chrominance is defined as the color saturation of each wavelength; and lumen intensity is defined as the physical quantity of the light intensity of the light source 12.

Further, the light source 12 of this preferred embodiment is a light emitting diode.

The light measurement system 10 comprises a processing unit 14, a capturing module 16, a signal conversion unit 18 and a demultiplexing unit 20.

The processing unit 14 includes a plurality of pins S0, S1, S2, S3, S4 for issuing plural kinds of control signals from the pins S0, S1, S2, S3, and the pin S4 is provided for receiving measurement results of the light characteristics from the demultiplexing unit 20. Wherein, the pins S0, S1, S2, S3 are divided into a trigger pin S0, a function pin S1, S2 and a switching pin S3 according to the desired function of the control signal.

In addition, the pins S0, S1, S2, S3 output a high potential or a low potential for outputting a control signal matched with "1" and "0" of a logic system. Wherein, the trigger pin S0 can output two logic states of "1" and "0" to define "Trigger" and "Not Trigger" respectively; the function pins S1, S2 can output four logic states of "00", "01", "10" and "11" to define "Measure the wavelength of red light", "Measure the wavelength of green light", "Measure the wavelength of blue light", and "Measure the lumen intensity of the light source" respectively; and the switching pin S3 also outputs two logic states which will be described further below.

Wherein, the trigger signal TS and the function signal FS can be transmitted between the processing unit 14 and the capturing module 16 through a first bus 30. Since the first bus 30 is coupled to the trigger pin S0 and the function pins S1, S2, therefore the first bus 30 can be comprised of three first transmission lines 302, 304, 306 for transmitting the trigger signal TS and the function signal FS; and the switch signal SS can be transmitted between the processing unit 14 and the capturing module 16 through a second bus 32. Wherein, the second bus 32 further comprises two second transmission lines 322, 324 coupled to the switching pins S3 and S4 respectively, and the second transmission line 322 is provided for transmitting the switch signal SWS and the second transmission line 324 is provided for transmitting a capture bit code CBC as described below.

The capturing module 16 is coupled to the processing unit 14, and each of the capturing modules 16 further comprises a control unit 162 and a sampling unit 164.

Wherein, the capturing module 16 receives the trigger signals TR and the function signals FS through the control unit 162. When the capturing module 16 receives the trigger signal TR, the trigger signal TR is provided for driving the sampling unit 164 to capture the light characteristics of the light source 12. For example, if the processing unit 14 outputs "1" from the trigger pin S0, it shows that the control unit 162 drives the sampling unit 162 and captures the light characteristics of the light source 12. On the other hand, if the trigger pin S0 outputs "0", it shows that the control unit 162 turns off the sampling unit 164, so that the light characteristics of the light source 12 will not be captured.

In addition, the control unit 162 determines and controls which type of light characteristics of the light source 12 to be captured by the sampling unit 164 according to the function signal FS. Assumed that the function pin S1, S2 outputs a control signal "00", the function signal FS controls the capturing module 16 to capture the light characteristics of the light source 12 with regard to the wavelength proximate to the frequency band of red light. In other words, the sampling unit 164 captures the portion of the wavelength proximate to the frequency band of red light from the light source 12 according to the control of the control unit 162, and the sampling unit 164 outputs the captured frequency-related data CD of red light. For example, the frequency in the captured data CD is equal to 482 THz (In other words, the measured wavelength of the red light source is equal to 622 nm). The relation of the frequency and the wavelength in the captured data CD is $f = c/\lambda$, wherein f is the frequency of the detection in unit of hertz (Hz); c is the speed of light equal to $3 \times 10^8$ m/s; and $\lambda$ is the wavelength in unit of meter (m).

For example, the control unit 162 receives the function signal FS transmitted from the processing unit 14 to control the sampling unit 164 to measure either the chrominance or the brightness of the light sources 12 with the wavelength of red light. Wherein, the function signal FS is defined as a signal for selectively measuring the wavelength of red light, the wavelength of green light, the wavelength of blue light and the lumen intensity through the function pins S1, S2.

The signal conversion unit 18 is coupled to the sampling unit 164 and provided for receiving the captured data CD and converting the captured data CD into a capture bit code CBC. Wherein, the capture bit code CBC is expressed in a binary number system (which is a number in terms of 2 to the power 0 to 9) and has 9 bits, so that the converted capture bit code CBC falls within a range from 000000000 to 111111111. In other words, the capture bit code CBC corresponds to a range from 0 to 1512 in the decimal number system.

In this preferred embodiment, the frequency of the captured data CD captured by the capturing module 16 falls within a range from 384 THz to 659 THz (In other words, the wavelength ranges from 455 nm to 780 nm) which is the optical spectrum range of visible lights. Therefore, the captured data CD can be converted easily by the signal conversion unit 18. For example, the frequency in the captured data CD is added with a correction value (such as −482 THz), so that after the captured data CD are processed by the signal conversion unit 18, the original captured data CD are corrected and expressed in form of the aforementioned 9 bits.

For example, if the frequency in the captured data CD is equal to 482 THz (In other words, the wavelength corresponding to the frequency is equal to 622 nm) in this preferred embodiment, then the capture bit code DBC will be converted to 000000000.

The demultiplexing unit 20 is coupled to the signal conversion unit 18 and the processing unit 14. Wherein, the demultiplexing unit 20 selectively controls the signal conversion unit 18 according to the switch signal SWS transmitted by the select pin S3 to control whether or not to connect the signal conversion unit 18 with the processing unit 14. If the signal conversion unit 18 and the processing unit 14 are coupled, then the capture bit code CBC can be transmitted from the signal conversion unit 18 to the processing unit 14 through the demultiplexing unit 20, or else the capture bit code CBC of the signal conversion unit 18 cannot be transmitted to the processing unit 14 through the demultiplexing unit 20. For example, if the switch signal SWS is "1", it shows that the signal conversion unit 18 and the processing unit 12 are coupled to each other. On the other hand, if the switch signal SWS is "0", it shows that the signal conversion unit 18 and the processing unit 12 are not coupled to each other.

In addition, the demultiplexing unit 20 comprises a plurality of input ports, output ports and selecting ports (not shown in the figure). Wherein, the input ports are coupled to the signal conversion unit 18, and the output ports and the selecting port are coupled to the processing unit 14. Further, the selecting port switches the connection path between the input ports and the output port according to the switch signal SWS received by the processing unit 14.

In addition, the signal conversion unit 18 and the demultiplexing unit 20 are comprised of field programmable gate arrays (FPGAs).

Figure 3:
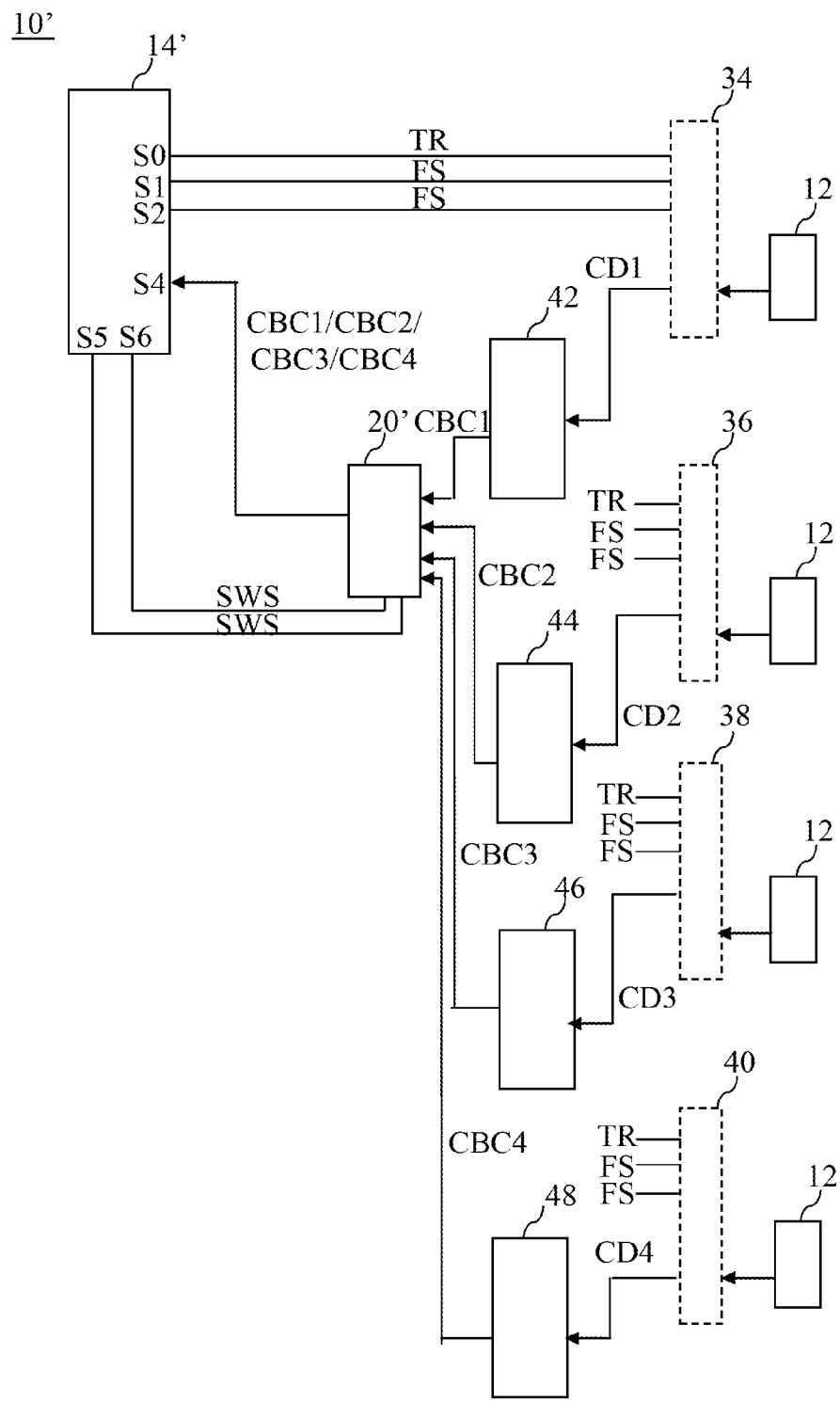
FIG. 3 is a schematic block diagram of a light measurement system in accordance with a second preferred embodiment of the present invention.

With reference to FIG. 3 for a schematic block diagram of a light measurement system in accordance with a second preferred embodiment of the present invention, the light measurement system 10' comprises a processing unit 14', a plurality of capturing modules 34, 36, 38, 40, and a plurality of signal conversion units 42, 44, 46, 48, and the demultiplexing unit 20' receives a control signal from two switching pins S5 and S6 used for forming a 1-to-4 connection path, In other words, the switching pins S5, S6 control the signal conversion units 42, 44, 46, 48 to output a plurality of capture bit codes CBC1, CBC2, CBC3, CBC4 to the processing unit 14'.

Wherein, the capturing modules 34, 36, 38, 40 are provided for simultaneously detecting four sets of light sources 12, and the capturing modules 34, 36, 38, 40 capture 4 groups of captured frequency-related data CD1, CD2, CD3, CD4, and the captured data CD1, CD2, CD3, CD4 are converted by the signal conversion units 34, 36, 38, 40 into the capture bit codes CBC1, CBC2, CBC3, CBC4 respectively. In addition, the demultiplexing unit 20' can selectively transmit one of the capture bit codes CBC1, CBC2, CBC3, CBC4 corresponding to the signal conversion units 42, 44, 46, 48 to the processing unit 14' by the control of the switching pins S5 and S6.

It is noteworthy that the light measurement systems 10, 10' of the first preferred embodiment or the second preferred embodiment further comprise a box body (not shown in the figure), and the box body has a containing space formed therein and provided for containing the capturing module 16, 34, 36, 38, 40, and the light measurement systems 10, 10' further comprise the light source 12 or contain the light source 12.

Therefore, the light measurement system of the present invention can measure the light characteristics of a plurality of light sources by a parallel processing structure, and the system simultaneously obtains the related light characteristics of the light sources from a plurality of capturing modules coupled to the light sources in advance and converts light characteristics into a plurality of captured frequency-related data, and the captured data are converted into a plurality of capture bit codes by a plurality of signal conversion units, and the capture bit codes are kept in the signal conversion units, and the demultiplexing unit is provided for outputting the capture bit code of the signal conversion unit to the processing unit in order to analyze the light characteristics according to the switching of the control signal.

While the invention has been described by means of specific embodiments, numerous modifications and variations could be made thereto by those skilled in the art without departing from the scope and spirit of the invention set forth in the claims.

What is claimed is:

1. A light measurement system, for measuring light characteristics of a plurality of light sources, comprising:
   a processing unit, having a plurality of pins, for transmitting a control signal through the pins;
   a plurality of capturing modules, coupled to the processing unit, and each of the capturing modules being provided for capturing light characteristics of each of the light sources, and each of the capturing modules having a control unit and a sampling unit, and the control unit controlling the sampling unit to capture the light characteristics of each of the corresponding light sources according to the control signal, and the sampling unit outputting captured frequency-related data according to the light characteristics;
   a plurality of signal conversion units, coupled to the sampling units of the capturing modules respectively, for converting the captured data into a capture bit code; and
   a demultiplexing unit, coupled to the signal conversion units and the processing unit, for switching a connection path between each of the signal conversion units and the processing unit according to the control signal of the processing unit to output the capture bit code to the processing unit from each of the signal conversion units.

2. The light measurement system of claim 1, further comprising a first bus and a second bus, and the first bus being coupled to the processing unit and the capturing module, and the second bus being coupled to the processing unit and the demultiplexing unit.

3. The light measurement system of claim 2, wherein the control signal is a trigger signal, a function signal and a switch signal, and the trigger signal is provided for driving the sampling unit to capture the light characteristics of the light source, and the function signal is provided for driving the sampling unit to capture the light characteristics of the light source, and the switch signal is provided for driving the demultiplexing unit to switch the connection path between each of the signal conversion units and the processing unit.

4. The light measurement system of claim 3, wherein the first bus includes a plurality of first transmission lines, and first transmission lines transmit the trigger signal and the function signal respectively.

5. The light measurement system of claim 3, wherein the second bus includes a plurality of second transmission lines, and the second transmission lines transmit the switch signal and receive the capture bit code respectively.

6. The light measurement system of claim 5, wherein the demultiplexing unit further comprises a plurality of input ports, output ports and selecting ports, and the input ports are coupled to the signal conversion units respectively, and the output port and the selecting port are coupled to the processing unit, and the selecting port switches the connection path between the input ports and the output port according to the switch signal received from the processing unit.

7. The light measurement system of claim 1, wherein the sampling unit captures at least one of the light characteristics selected from the collection of wavelength, phase, polarization state, chrominance and lumen intensity of one of the light sources.

8. The light measurement system of claim 7, wherein the control signal drives the sampling unit to capture at least one of the light characteristics selected from the collection of the chrominance and the lumen intensity of the light source.

9. The light measurement system of claim 8, wherein the sampling unit measures the light characteristics of the wavelength of the light source with a frequency band proximate to the frequency band of red light, the frequency band of green light and the frequency band of blue light according to the control signal.

10. The light measurement system of claim 1, further comprising a box body with a containing space formed therein for containing at least one of the capturing module and the light source.

\* \* \* \* \*